United States Patent
Lee et al.

(10) Patent No.: US 7,597,302 B2
(45) Date of Patent: Oct. 6, 2009

(54) ELEVATION-ADJUSTABLE SUPPORT STRUCTURE

(75) Inventors: Yung-Ta Lee, Sinjhuang (TW); Chia-Han Lin, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 8 days.

(21) Appl. No.: 11/896,930

(22) Filed: Sep. 6, 2007

(65) Prior Publication Data
US 2008/0277539 A1 Nov. 13, 2008

(30) Foreign Application Priority Data
May 8, 2007 (TW) .............................. 96116217 A

(51) Int. Cl.
*A47G 29/00* (2006.01)
(52) U.S. Cl. .................. 248/371; 248/157; 248/917; 248/922; 361/679.21
(58) Field of Classification Search ............. 248/371, 248/284.1, 917, 919, 920, 921, 922, 157; 361/681, 682; 16/366
See application file for complete search history.

(56) References Cited

U.S. PATENT DOCUMENTS

| | | | | |
|---|---|---|---|---|
| 5,538,214 A | * | 7/1996 | Sinila | 248/278.1 |
| 6,382,577 B1 | * | 5/2002 | McCoy et al. | 248/284.1 |
| 6,822,857 B2 | * | 11/2004 | Jung et al. | 361/681 |
| 6,929,224 B1 | * | 8/2005 | Masuda et al. | 248/176.3 |
| 7,198,237 B2 | * | 4/2007 | Cho et al. | 248/133 |
| 7,404,233 B2 | * | 7/2008 | Lu et al. | 16/302 |

* cited by examiner

*Primary Examiner*—Anita M King
(74) *Attorney, Agent, or Firm*—Guice Patents PLLC

(57) ABSTRACT

An elevation-adjustable support structure includes a connecting member, a bottom hinge structure, which comprises two bottom brackets, and a shaft fastened to the bottom brackets and pivoted to the bottom end of the connecting member for allowing the connecting member to be turned about the shaft between the two bottom brackets, a top hinge structure, which comprises two top brackets and two shafts respectively fastened to the top brackets and pivoted to the top end of the connecting member for allowing the connecting member to be turned about the shafts between the two top brackets; and two linking mechanisms each having a top wheel and a bottom wheel respectively coupled between the top end of the connecting member and the top brackets and the bottom end of the connecting member and the bottom brackets and a flexible belt member coupled between the top wheel and the bottom wheel for maintaining the angle of inclination of the top brackets upon a rotary motion of the connecting member relative to the top hinge structure and the bottom hinge structure.

15 Claims, 7 Drawing Sheets

ELEVATION-ADJUSTABLE SUPPORT STRUCTURE

BACKGROUND OF THE INVENTION

1. Field of the Invention

The present invention relates to support means and more particularly, to an elevation-adjustable support structure comprised of a top hinge structure, a bottom hinge structure, and two linking mechanisms bilaterally coupled between the top hinge structure and the bottom hinge structure to maintain the angle of inclination of the supported member during adjustment of the elevation of the elevation-adjustable support structure.

2. Description of the Related Art

For the advantages of light and thin quality characteristics and non-radiation, flat-panel monitors, such as LCD monitors, LCD TVs, and plasma TVs will gradually replace conventional CRT monitors and CRT TVs. When watching a LCD monitor, LCD TV, or plasma TV, there is a limitation of view angle. Therefore, a LCD monitor, LCD TV, or plasma TV generally has a hinge structure provided between the display panel and the base so that the angle of inclination of the display panel can be adjusted relative to the base.

Except the adjustment of angle of inclination, a conventional LCD monitor LCD TV, or plasma TV does not allow the user to adjust the display panel in vertical or horizontal direction relative to the base. To eliminate this problem, elevation adjustable designs are developed. China Patent No. CN 1244852C, equivalent to U.S. Pat. No. 6,822,857, discloses a monitor improved in tilting structure in which a link member having upper and lower ends is rotatably combined to a main hinge provided in the monitor main body and a base hinge is provided in the base member. The monitor also includes an auxiliary link member to connect the main and base hinges, and disposed in parallel with the link member, being eccentric with the monitor hinge and the base hinge, a main bracket interposed between the monitor main body and the link member, and a pivot part to pivot the monitor main body upon the main bracket. This design allows the monitor main body to be controlled in tilt, planar rotation, and height, thus, maintaining tilt regardless of the height control.

The aforesaid four-bar linkage causes high impact in the related industry. Under the consideration of patent infringement and design around, people in this art are trying hard to develop other linking designs to substitute the aforesaid four-bar linkage.

SUMMARY OF THE INVENTION

The present invention has been accomplished under the circumstances in view.

According to one aspect of the present invention, the elevation-adjustable support structure comprises a connecting member, the connecting member having a bottom end and a top end; a bottom hinge structure, the bottom hinge structure comprising two bottom brackets, and at least one shaft fastened to the bottom brackets and pivoted to the bottom end of the connecting member for allowing the connecting member to be turned about the at least one shaft of the bottom hinge structure between the two bottom brackets; a top hinge structure, the top hinge structure comprising two top brackets, and at least one shaft fastened to the top brackets and pivoted to the top end of the connecting member for allowing the connecting member to be turned about the at least one shaft of the top hinge structure between the two top brackets; and at least one linking mechanism, the at least one linking mechanism each comprising a top wheel respectively coupled between the top end of the connecting member and the top brackets of the top hinge structure, a bottom wheel respectively coupled between the bottom end of the connecting member and the bottom brackets of the bottom hinge structure, and a flexible belt member coupled between the top wheel and the bottom wheel for maintaining the angle of inclination of the top brackets upon a rotary motion of the connecting member relative to the top hinge structure and the bottom hinge structure.

According to another aspect of the present invention, the connecting members comprises two top lugs and two bottom lugs respectively extended from the top end and the bottom end, the top lugs and the bottom lugs each having a pivot hole for receiving the at least one shaft of top hinge structure and the at least one shaft of the bottom hinge structure respectively.

According to still another aspect of the present invention, the bottom brackets are fastened to a base member; the top brackets are fastened to a top mount to support a supported member.

According to still another aspect of the present invention, the bottom hinge structure is comprised of two hinges, the two hinges of the bottom hinge structure each comprising one shaft of the at least one shaft of the bottom hinge structure, a first gasket, a second gasket, a ring lug at one of the bottom brackets, at least one spring washer, and an end piece member, the shaft of each hinge of the bottom hinge structure being inserted in an order through the pivot hole of one bottom lug of the connecting member, the associating first gasket, the associating second gasket, the ring lug of the associating bottom bracket, and the associating at least one spring washer, and then fastened up with the associating end piece member.

According to still another aspect of the present invention, each hinge of the bottom hinge structure further comprises a friction member mounted on the associating shaft between the associating bottom lug and the associating first gasket, the friction member having a pin inserted into a retaining hole in the associating bottom lug.

According to still another aspect of the present invention, the shafts of the hinges of the bottom hinge structure are axially formed integral with each other; the bottom hinge structure further comprises a torsional spring sleeved onto the integrated shafts of the hinges of the bottom hinge structure, the torsional spring having two opposite ends respectively stopped at a groove at the bottom end of the connecting member and the surface of the base member that is fastened to the bottom brackets.

According to still another aspect of the present invention, the first gasket of each hinge of the bottom hinge structure has a protruding portion engaged in an arched notch at the associating bottom lug of the connecting member.

According to still another aspect of the present invention, the second gasket of each hinge of the bottom hinge structure is fixedly mounted in the ring lug of the associating bottom bracket, having at least one pin respectively inserted into a respective hole on the ring lug of the associating bottom bracket.

According to still another aspect of the present invention, the top hinge structure is comprised of two hinges, the two hinges of the top hinge structure each comprising one shaft of the at least one shaft of the top hinge structure, a first gasket, a second gasket, a ring lug at one of the bottom brackets, at least one spring washer, and an end piece member, the shaft of each hinge of the top hinge structure being inserted in an order through the pivot hole of one top lug of the connecting member, the associating first gasket, the associating second gasket, the ring lug of the associating bottom bracket, and the associating at least one spring washer, and then fastened up with the associating end piece member.

According to still another aspect of the present invention, each hinge of the top hinge structure further comprises a friction member mounted on the associating shaft between the associating top lug and the associating first gasket, the friction member of each hinge of the top hinge structure having a pin inserted into a retaining hole in the associating top lug.

According to still another aspect of the present invention, the first gasket of each hinge of the top hinge structure has a protruding portion engaged in an arched notch at the associating top lug of the connecting member.

According to still another aspect of the present invention, each hinge of the top hinge structure further comprises a retaining ring and a locating ring connected between the shaft and top bracket of the respective hinge, the locating ring being fastened to the ring lug of the associating top hinge structure, the retaining ring having two protruding portions, the locating ring having two arched retaining grooves symmetrically disposed at two opposite sides; when the top brackets are turned with the top mount, each protruding portion of the retaining ring is moved over one retaining groove of the locating ring into the other retaining groove of the locating ring to hold the top mount in parallel to the base member.

According to still another aspect of the present invention, the top wheel and the bottom wheel each have a belt groove extending around the periphery thereof, and the belt member is an endless belt coupled to the belt groove of the top wheel and the belt groove of the bottom wheel.

According to still another aspect of the present invention, the top wheel and the bottom wheel can be chain wheels, and the belt member can be a chain meshed with the chain wheels.

According to still another aspect of the present invention, the top wheel and the bottom wheel can be gear wheels, and the belt member can be a toothed belt meshed with the gear wheels.

DETAILED DESCRIPTION OF THE PREFERRED EMBODIMENT

Figure 1:
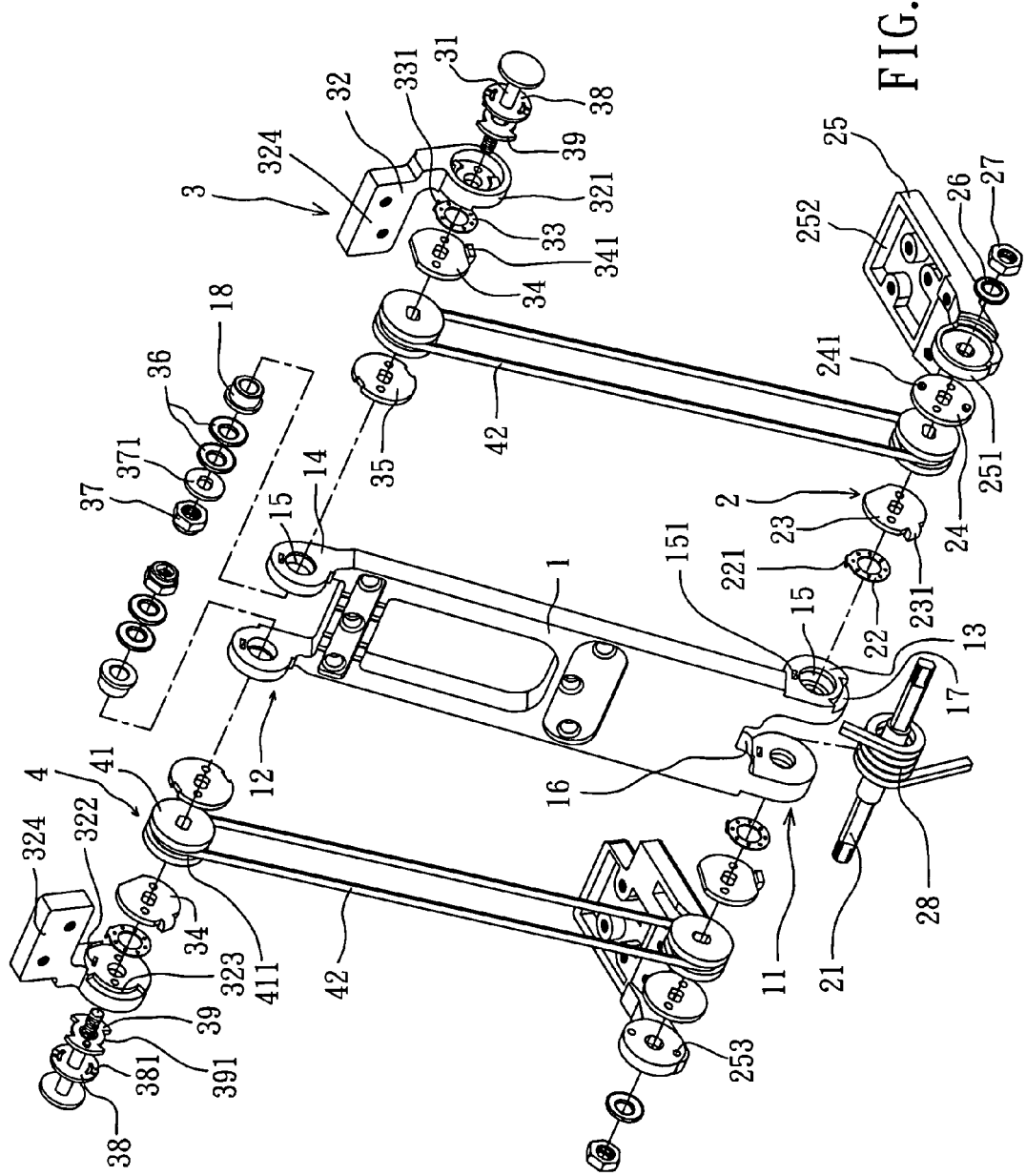
FIG. 1 is an exploded view of an elevation-adjustable support structure in accordance with the present invention.
Figure 2:
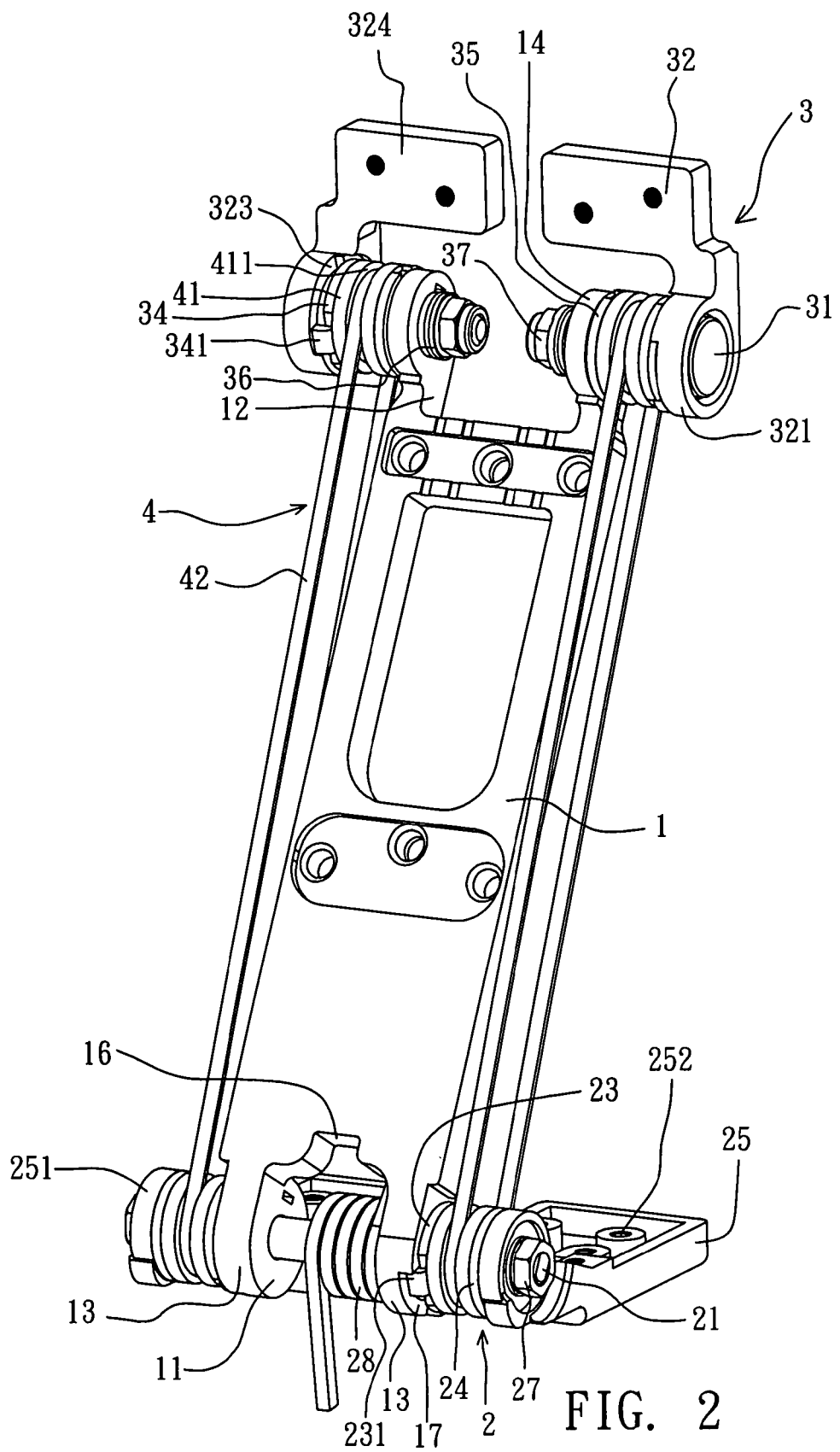
FIG. 2 is an oblique elevation of the elevation-adjustable support structure according to the present invention.
Figure 3:
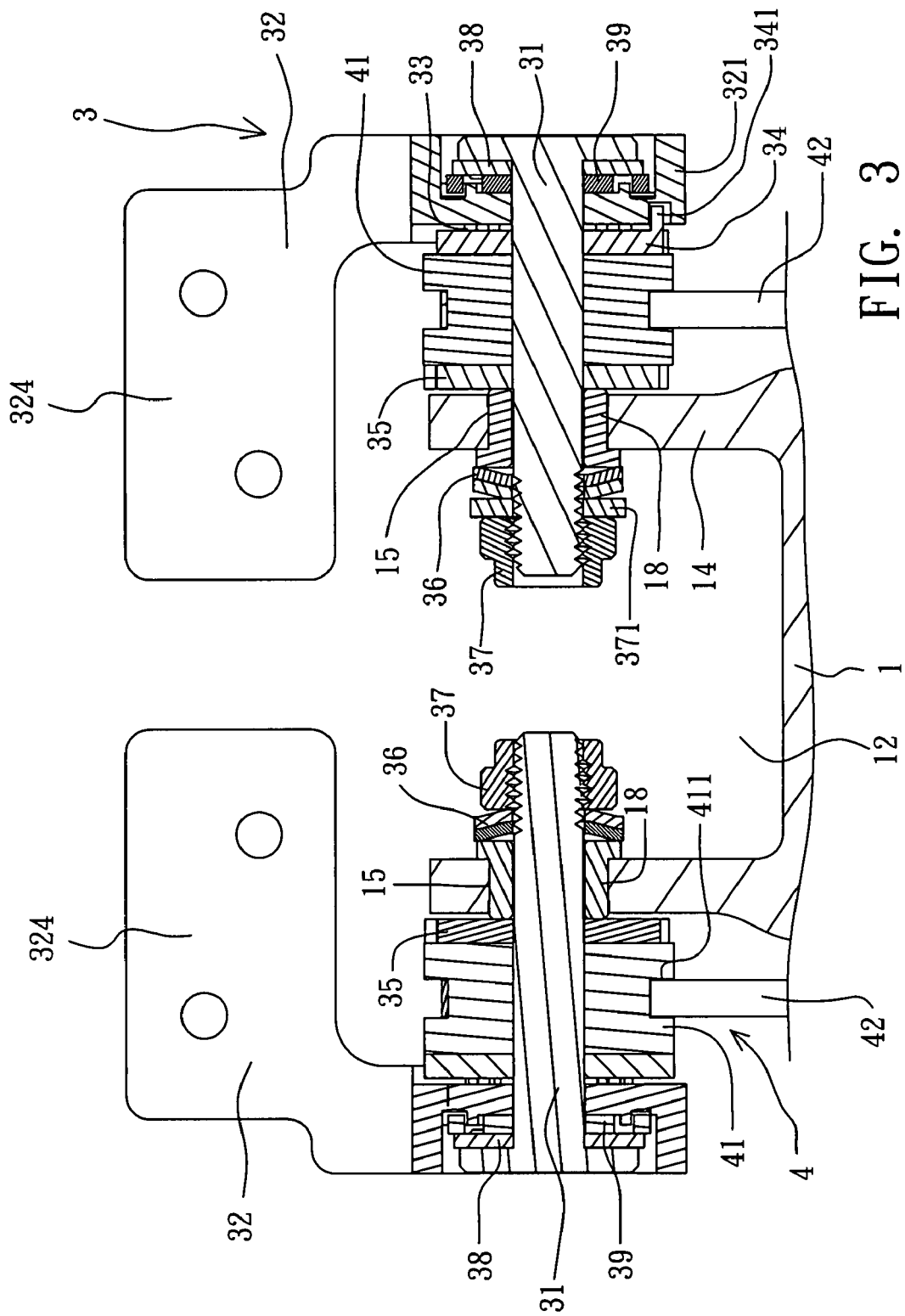
FIG. 3 is a sectional assembly view of the top hinge structure of the elevation-adjustable support structure according to the present invention.
Figure 4:
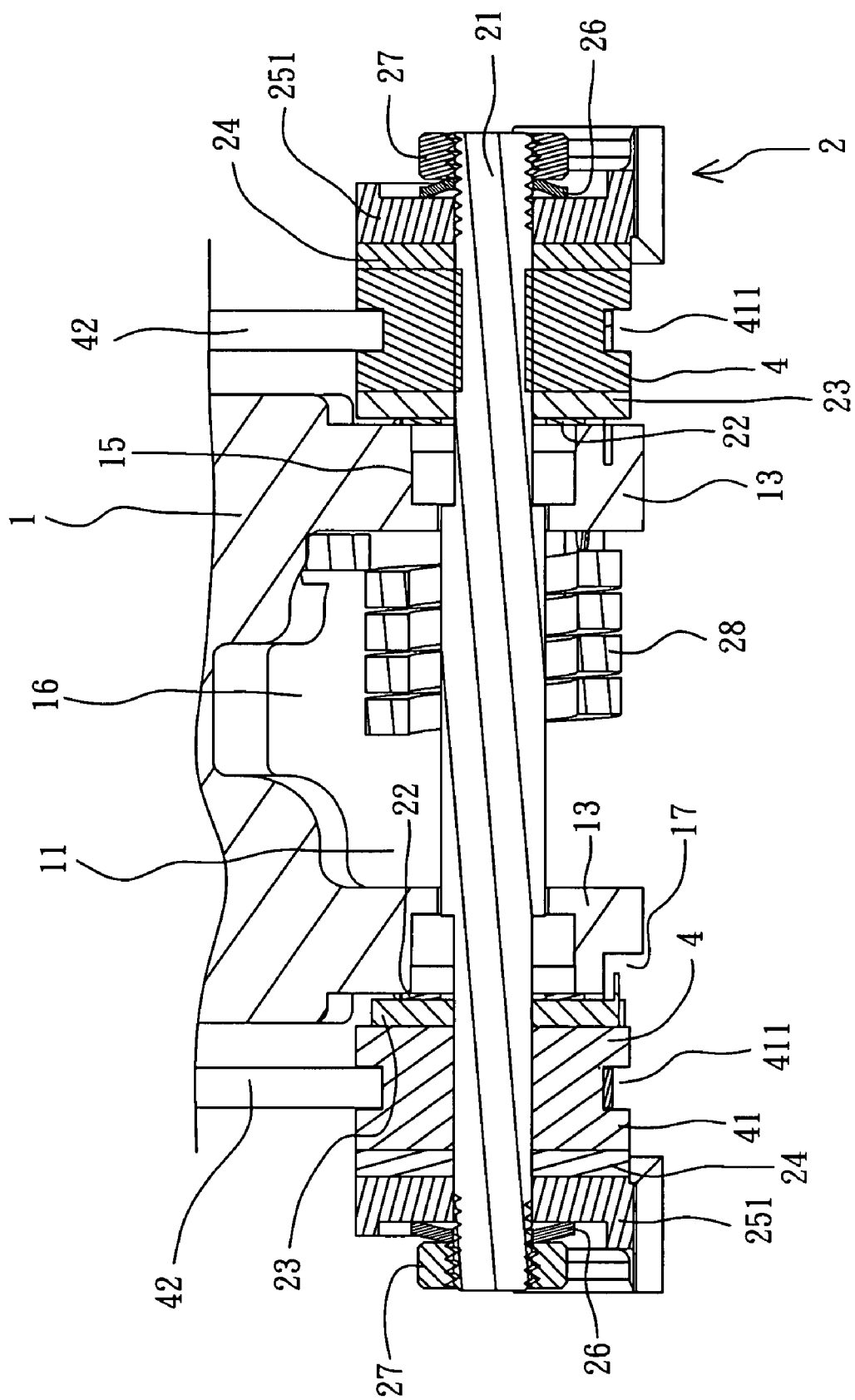
FIG. 4 is a sectional assembly view of the bottom hinge structure of the elevation-adjustable support structure according to the present invention.
Figure 5:
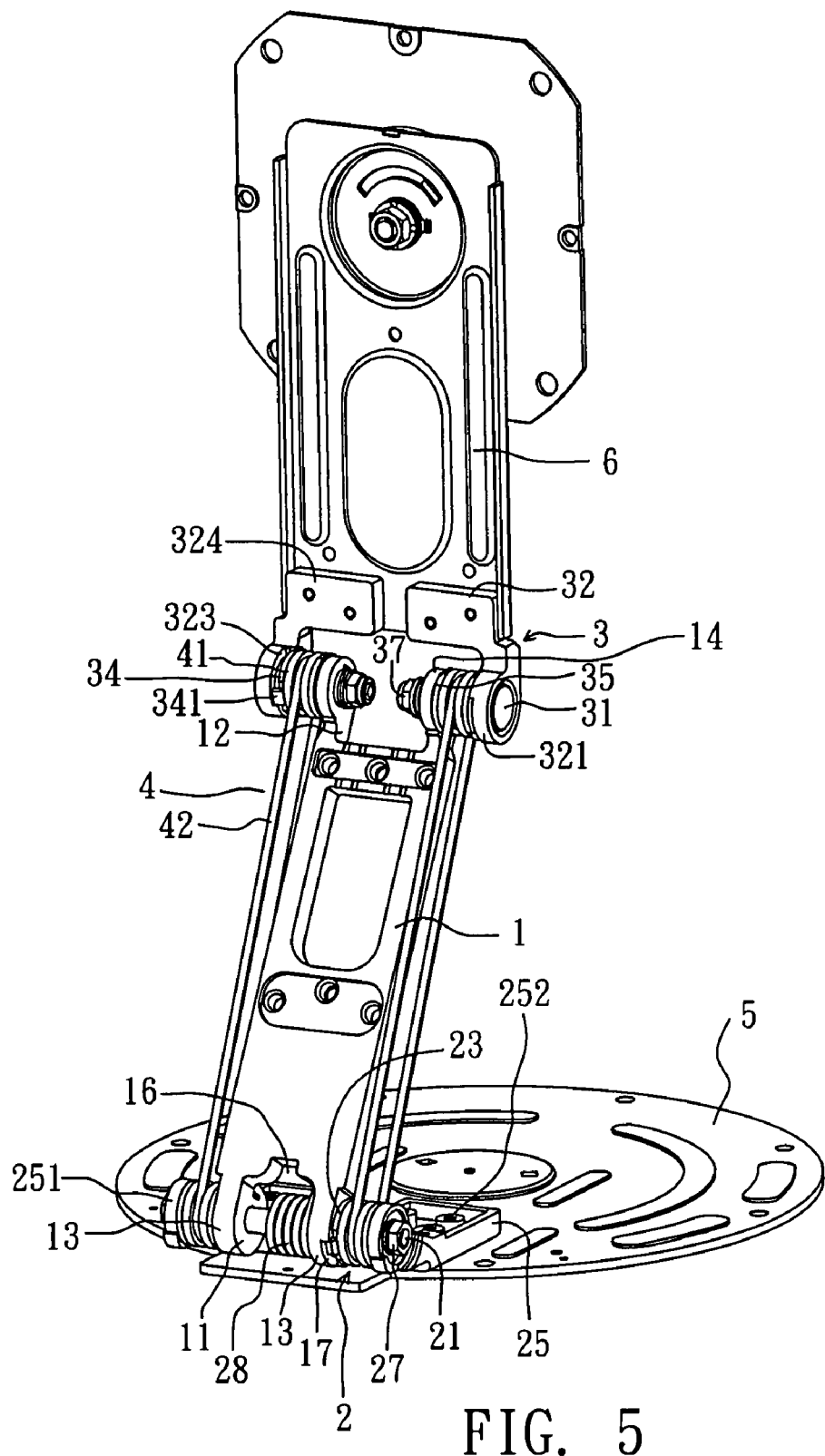
FIG. 5 is an elevational view showing the elevation-adjustable support structure connected between a base member and a top mount according to the present invention.

Referring to FIGS. 1 to 5, an elevation-adjustable support structure in accordance with the present invention is comprised of a connecting member 1, a bottom hinge structure 2, a top hinge structure 3, and at least one linking mechanism 4.

The connecting member 1 is an elongated flat plate member having a bottom end 11 pivotally connected to a base member 5 through the bottom hinge structure 2 and a top end 12 pivotally connected to a top mount 6 through the top hinge structure 3. As illustrated, the bottom end 11 has two parallel bottom lugs 13, and the top end 12 has two parallel top lugs 14. The bottom lugs 13 and the top lugs 14 each have a pivot hole 15 for coupling to the bottom hinge structure 2 and the top hinge structure 3 respectively.

The bottom hinge structure 2 is formed of two hinges respectively coupled to the bottom lugs 13 of the connecting member 1. Each hinge of the bottom hinge structure 2 comprises a shaft 21 inserted in proper order through the pivot hole 15 of one bottom lug 13 of the connecting member 1, a friction plate 22, a first gasket 23, a second gasket 24, a ring lug 251 of a respective bottom bracket 25, and at least one spring member 26, and then fastened up with an end piece member 27, for example, lock nut. Thus, the connecting member 1 can be rotated relative to the two bottom brackets 25 and maintained in the adjusted position. The friction plate 22 has a pin 221 inserted into a retaining hole 151 in the periphery of the pivot hole 15 of the associating bottom lug 13 to prohibit rotation of the friction plate 22 relative to the associating bottom lug 13.

As illustrated in FIG. 1, the two hinges of the bottom hinge structure 2 use the common shaft 21. A torsional spring 28 is sleeved onto the shaft 21 and disposed between the two bottom lugs 13 of the connecting member 1, having its two opposite ends respectively stopped at a groove 16 at the bottom end 11 of the connecting member 1 and the surface of a base member 5. When turning the connecting member 1 downwards, the connecting member 1 gives a pressure to the torsional spring 28. Further, the two bottom brackets 25 each have a connecting portion 252 respectively connected to the base member 5 with a screw or the like. The base member 5 can be made in any shape or specifications subject to client's requirements. According to this embodiment, the two hinges of the bottom hinge structure 2 use one common shaft. Alternatively, the two hinges can be made using a respective shaft.

Because the shaft 21 is affixed to the ring lugs 251 of the bottom brackets 25, friction force is produced between the bottom lug 13 and the friction plate 22 and first gasket 23 of each hinge of the first hinge structure 2. The connecting member 1 is turnable about the shaft 21 relative to the two bottom brackets 25. Because the two opposite ends of the torsional spring 28 are respectively stopped against the connecting member 1 and the base member 5, a protruding portion 231 of the first gasket 23 is kept engaged in a notch 17 of the associating bottom lug 13, holding the connecting member 1 in a predetermined angle of inclination relative to the two bottom brackets 25. Further, the second gasket 24 is fixedly mounted in the ring lug 251 of the associating bottom bracket 25, having at least one pin 241 respectively inserted into a respective hole 253 on the ring lug 251 of the associating bottom bracket 25. Therefore, the second gasket 24 is firmly secured to the ring lug 251 of the associating bottom bracket 25.

The top hinge structure 3 is formed of two hinges respectively coupled to the top lugs 14 of the connecting member 1. Each hinge of the top hinge structure 3 comprises a shaft 31 inserted in proper order through a ring lug 321 of a respective top bracket 32, a friction plate 33, a first gasket 34, a second gasket 35, an axle sleeve 18 in the pivot hole 15 of the associating top lug 14, at least one spring member 36, and a washer 371, and then fastened up with an end piece member 37, for example, lock nut. Thus, the two top brackets 32 can be turned relative to the connecting member 1 and maintained in the adjusted position. Further, the spring members 26 and 36 of the hinge structures 2 and 3 can be disk springs, wave-like spring plates, or coiled springs.

The friction plate 33 has a pin 331 fastened to a retaining groove 322 at the ring lug 321 of the associating top bracket 32. The ring lug 321 of each top bracket 32 has an arched notch 323 for receiving a protruding portion 341 of the first gasket 34 to limit the inclination angle adjustment range of the top brackets 32. Further, the top brackets 32 each have a mounting portion 324 respectively affixed to the top mount 6 with screws to support a supported member, for example, flat-panel monitor. At this time, the gravity weight of the flat-panel monitor forces the top brackets 32 to turn slightly downwards, keeping the respective arched notches 323 respectively stopped against the protruding portion 341 of the first gaskets 34 of the respective hinges. By means of the friction force along the top brackets 32, the friction plates 33, the gaskets 34 and 35 and the axle sleeves 18, the top mount 6 with the supported member are positively secured in the adjusted angle of inclination. According to the present invention, the top brackets 32 of the hinges of the top hinge structure 3 are respectively connected to the top mount 6. The top mount 6 can be made in any shape or specifications subject to client's requirements.

Further, a retaining ring 38 and a locating ring 39 are connected between the shaft 31 and top bracket 32 of each hinge of the top hinge structure 3. The locating ring 39 is fastened to the inside of the ring lug 321. The retaining ring 38 has two protruding portions 381. The locating ring 39 has two arched retaining grooves 391 symmetrically disposed at two opposite sides. When the top brackets 32 are turned with the top mount 6, each protruding portion 381 of the retaining ring 38 is moved over one retaining groove 391 into the other retaining groove 391 to hold the top mount 6 in parallel to the base member 5.

The linking mechanism 4 comprises two wheels 41 respectively coupled to the bottom end 11 and top end 12 of the connecting member 1 at one lateral side and respectively pivoted to the shaft 21 of the bottom hinge structure 2 and the shaft 31 of one hinge of the top hinge structure 3, and a flexible belt member 42 is coupled between the two wheels 41. The flexible belt member 42 can be a leather belt, fabric rope, or steel rope. The wheels 41 each have a wheel groove 411 extending around the periphery for securing the flexible belt member 42. Alternatively, chain wheels or gear wheels may be used with a chain or toothed belt to achieve the expected four-bar linkage effect.

Figure 6C:
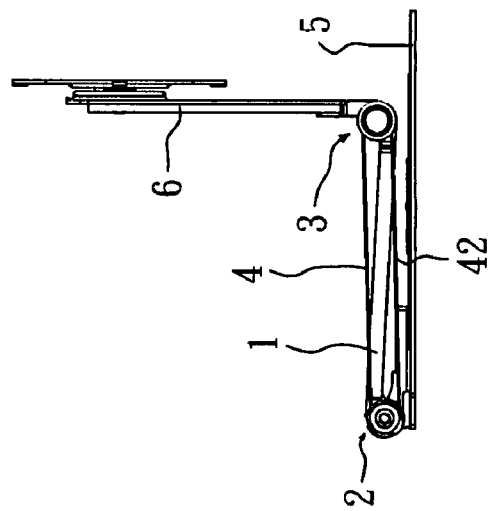
FIGS. 6a to 6c are schematic drawing showing elevation adjustment of the elevation-adjustable support structure according to the present invention.
Figure 6B:
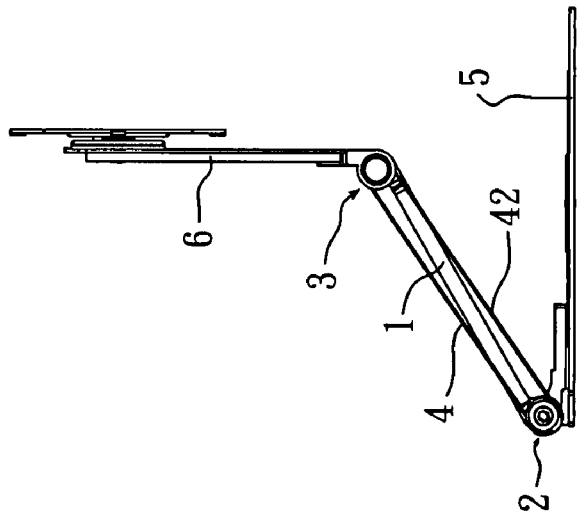
Figure 6A:
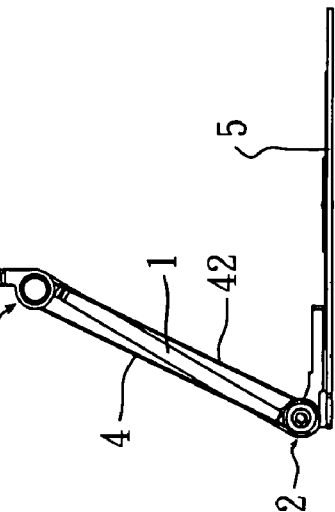

Referring to FIGS. 6a to 6c, when adjusting the elevation of the supported member (for example, flat-panel monitor), i.e., when rotating the connecting member 1 upwards or downwards, it is turned about the shaft 21 of the bottom hinge structure 2. Because the linking mechanism 4 works as a four-bar linkage, the elevation difference produced upon rotation of the connecting member 1 does not cause rotation of the wheel 41 at the bottom end 11 of the connecting member 1, and at the same time the wheel 41 at the top end 12 of the connecting member 1 and the shafts 31 and top brackets 32 of the hinges of the top hinge structure 3 are turned relative to the top lugs 14 of the connecting member 1 to compensate the elevation difference. Therefore, the angle of inclination of the top mount 6 is maintained unchanged during adjustment of the elevation of the top mount 6, i.e., the two top brackets 32 do not change their angle of inclination subject to rotation of the connecting member 1.

Figure 7A:
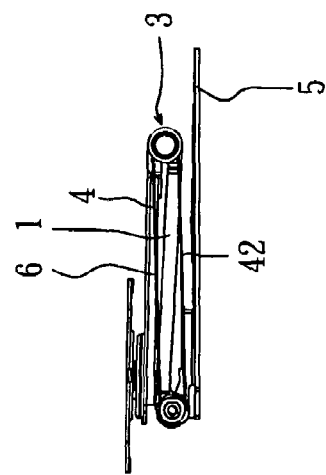
FIGS. 7a to 7c are schematic drawing showing collapse adjustment of the elevation-adjustable support structure according to the present invention.
Figure 7B:
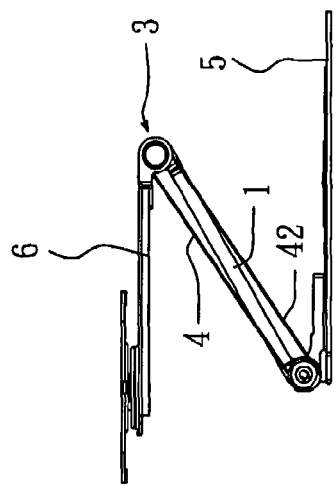
Figure 7C:
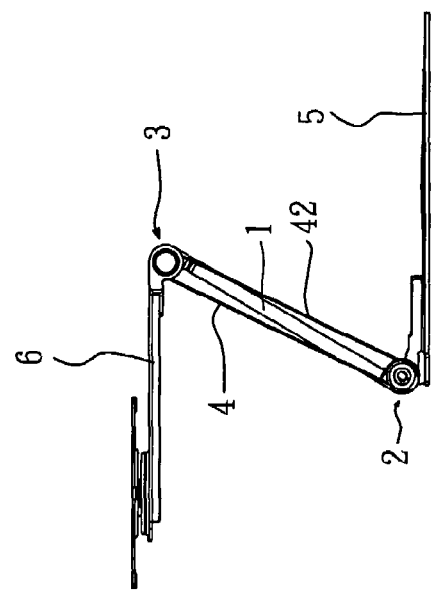

Referring to FIG. 7a, the top mount 6 is kept in parallel to the base member 5. When applied a downward pressure to the top mount 6, the connecting member 1 is turned downwards as shown in FIG. 7b. Continuously applying the downward pressure to the top mount 6, the distance between the top mount 6 and the base member 5 is greatly shortened as shown in FIG. 7c, reducing much the dimensions to reduce the delivery space and transportation cost.

As stated above, the invention has the linking mechanism connected between the top hinge structure and the bottom hinge structure. When adjusting the elevation and angle of inclination of the supported member, the radius of gyration of the linking mechanism is used for the moving range of the connecting member so that the linking mechanism works as a four-bar linkage without affecting the angle of inclination of the two to brackets. Further, retaining rings and locating rings are coupled between the shafts and top brackets of the top hinge structure. When the top brackets are rotated counter-clockwise, the protruding portions of the retaining rings are respectively forced into engagement with the arched retaining grooves of the locating ring, keeping the top brackets of the top hinge structure in parallel to the bottom brackets of the bottom hinge structure. When applying a downward pressure to lower the connecting member at this time, the top brackets are moved toward the bottom brackets to reduce the size of the whole assembly, saving much delivery space and transportation cost.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An elevation-adjustable support structure comprising:
   a connecting member, said connecting member having a bottom end and a top end;
   a bottom hinge structure, said bottom hinge structure comprising two bottom brackets, and at least one shaft fastened to said bottom brackets and pivoted to the bottom end of said connecting member for allowing said connecting member to be turned about the at least one shaft of said bottom hinge structure between said two bottom brackets;
   a top hinge structure, said top hinge structure comprising two top brackets, and at least one shaft fastened to said top brackets and pivoted to the top end of said connecting member for allowing said connecting member to be turned about the at least one shaft of said top hinge structure between said two top brackets; and
   at least one linking mechanism, said at least one linking mechanism each comprising a top wheel respectively coupled between the top end of said connecting member and the top brackets of said top hinge structure, a bottom wheel respectively coupled between the bottom end of said connecting member and the bottom brackets of said bottom hinge structure, and a flexible belt member coupled between said top wheel and said bottom wheel for maintaining the angle of inclination of said top brackets upon a rotary motion of said connecting member relative to said top hinge structure and said bottom hinge structure.

2. The elevation-adjustable support structure as claimed in claim 1, wherein said connecting member comprises two top lugs and two bottom lugs respectively extended from said top end and said bottom end, said top lugs and said bottom lugs each having a pivot hole for receiving the at least one shaft of top hinge structure and the at least one shaft of said bottom hinge structure respectively.

3. The elevation-adjustable support structure as claimed in claim 1, wherein said bottom brackets are fastened to a base member; said top brackets are fastened to a top mount to support a supported member.

4. The elevation-adjustable support structure as claimed in claim 2, wherein said bottom hinge structure is comprised of two hinges, the two hinges of said bottom hinge structure each comprising one shaft of the at least one shaft of said bottom hinge structure, a first gasket, a second gasket, a ring lug at one of said bottom brackets, at least one spring washer, and an end piece member, the shaft of each hinge of said bottom hinge structure being inserted in an order through the pivot hole of one bottom lug of said connecting member, an associating first gasket, an associating second gasket, the ring lug of an associating bottom bracket, and an associating at least one spring washer, and then fastened up with an associating end piece member.

5. The elevation-adjustable support structure as claimed in claim 4, wherein each hinge of said bottom hinge structure further comprises a friction member mounted on the associating shaft between the associating bottom lug and the associating first gasket, said friction member having a pin inserted into a retaining hole in the associating bottom lug.

6. The elevation-adjustable support structure as claimed in claim 4, wherein the shaft of a first hinge of the two hinges of said bottom hinge structure is axially formed integral with the shaft of a second hinge structure of the two hinges; said bottom hinge structure further comprises a torsional spring sleeved onto the integrated shafts of the hinges of said bottom hinge structure, said torsional spring having two opposite ends respectively stopped at a groove at the bottom end of said connecting member and the surface of said base member that is fastened to said bottom brackets.

7. The elevation-adjustable support structure as claimed in claim 4, wherein the first gasket of each hinge of said bottom hinge structure has a protruding portion engaged in an arched notch at the associating bottom lug of said connecting member.

8. The elevation-adjustable support structure as claimed in claim 4, wherein the second gasket of each hinge of said bottom hinge structure is fixedly mounted in the ring lug of the associating bottom bracket, having at least one pin respectively inserted into a respective hole on the ring lug of the associating bottom bracket.

9. The elevation-adjustable support structure as claimed in claim 2, wherein said top hinge structure is comprised of two hinges, the two hinges of said top hinge structure each comprising one shaft of the at least one shaft of said top hinge structure, a first gasket, a second gasket, a ring lug at one of said top brackets, at least one spring washer, and an end piece member, the shaft of each hinge of said top hinge structure being inserted in an order through the pivot hole of one of said top lug of said connecting member, an associating first gasket, an associating second gasket, the ring lug of an associating top bracket, and an associating at least one spring washer, and then fastened up with an associating end piece member.

10. The elevation-adjustable support structure as claimed in claim 9, wherein each hinge of said top hinge structure further comprises a friction plate mounted on the associating shaft between the associating ring lug and the associating first gasket, the friction plate of each hinge of said top hinge structure having a pin inserted into a retaining groove in the associating ring lug.

11. The elevation-adjustable support structure as claimed in claim 9, wherein the first gasket of each hinge of said top hinge structure has a protruding portion engaged in an arched notch of the associating top bracket.

12. The elevation-adjustable support structure as claimed in claim 9, wherein each hinge of said top hinge structure further comprises a retaining ring and a locating ring connected between the shaft and top bracket of the respective hinge, said locating ring being fastened to the ring lug of the associating top hinge structure, said retaining ring having two protruding portions, said locating ring having two arched retaining grooves symmetrically disposed at two opposite sides; when said top brackets are turned with said top mount, each protruding portion of said retaining ring is moved over one retaining groove of said locating ring into the other retaining groove of said locating ring to hold said top mount in parallel to said base member.

13. The elevation-adjustable support structure as claimed in claim 1, wherein said top wheel and said bottom wheel each have a belt groove extending around the periphery thereof, and said belt member is an endless belt coupled to the belt groove of said top wheel and the belt groove of said bottom wheel.

14. The elevation-adjustable support structure as claimed in claim 1, wherein said top wheel and said bottom wheel are chain wheels; said belt member is a chain meshed with said chain wheels.

15. The elevation-adjustable support structure as claimed in claim 1, wherein said top wheel and said bottom wheel are gear wheels; said belt member is a toothed belt meshed with said gear wheels.

* * * * *